June 9, 1953  J. BROIDO  2,641,059
FOOTAGE INDICATOR FOR MOTION-PICTURE CAMERAS
Filed June 26, 1950
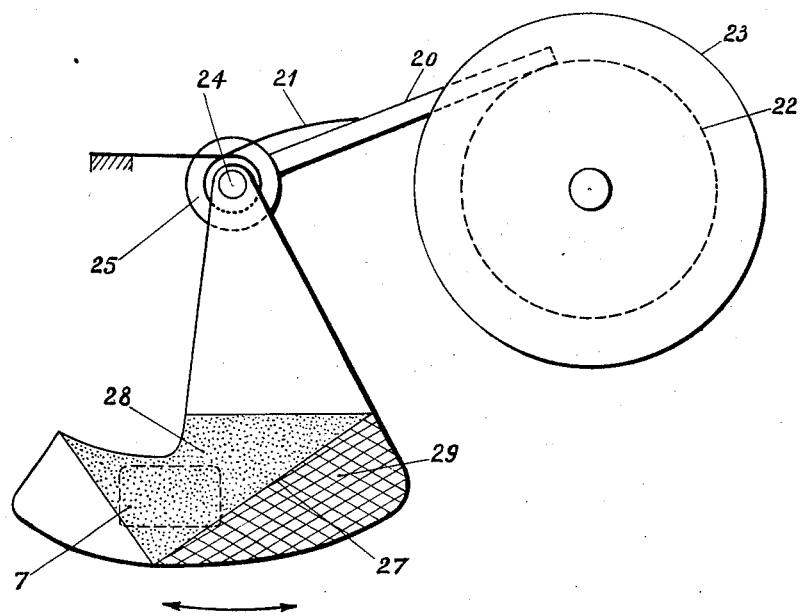
INVENTOR:
Jacques BROIDO
by [signature]
Attorney Patented June 9, 1953

2,641,059

UNITED STATES PATENT OFFICE 2,641,059

FOOTAGE INDICATOR FOR MOTION-PICTURE CAMERAS

Jacques Broïdo, Carouge-Geneva, Switzerland

Application June 26, 1950, Serial No. 170,301
In France February 14, 1950

3 Claims. (Cl. 33—172)

The invention relates to a footage indicator for motion picture cameras and more particularly to the devices of the kind comprising a feeling lever pivotally arranged within the camera, applied by a spring to the surface of the film roll and carrying a graduated dial movable in front of an index behind an opening provided in the wall of the camera, so as to indicate the remaining length of the unexposed film. It may occur however sometimes that the reading given by the footage indicator of this kind is inaccurate due to the fact that the outer turns of the film roll are more or less unrolled and that the strength of the spring pressing the feeling lever is unsufficient to strongly apply said outer film turns to the roll, thus indicating a roll radius having a larger value than that corresponding to the remaining length of the film.

The object of the footage indicator according to the invention is to avoid the above mentioned drawback and it is provided to this end with means allowing to manually apply the feeling lever onto the film roll without opening the camera in order to obtain an accurate reading.

According to the invention the feeling lever is carried by a shaft extending outside the camera and provided at its outer end with a control knob, said shaft further carrying inside the camera an indicating dial movable in front of a viewing opening provided in the wall of the camera.

Another object of the invention is to facilitate the reading of the dial by replacing the graduation thereof by two differently painted areas on either side of a separation line the form of which is determined so that the surfaces of the differently painted areas seen through the viewing opening are substantially proportional to the lengths of the unexposed and exposed film respectively. The figure in the drawing is a side elevation of the film footage recorder.

The improvement, according to the invention, provides on one hand a safer functioning of the indicator and on the other hand a quick rough estimate during the operation of the camera without having to approach the eye to the small opening through which the graduation can be seen. As shown in the drawing therefore the feeling lever 20, kept, in a known manner, by means of spiral spring 21 in close contact with the film 22 on the delivering film-roll 23, is mounted on the shaft 24 of a knob 25, located on an outer side of the camera. Previous to any measurement, the knob 25 is to be motioned several times to tightly apply the lever 20 to the film 22, thus avoiding a risk of a wrong location of the lever resulting either from a friction preventing its application on the film, either from a fold or a loop of the film. Furthermore the insertion of the film rolls in the camera is made easier by the possible operation of the feeling lever with an outer knob. The shaft 24 carries a dial in the shape of a sector bearing a graduation in meters (not shown) movable in front of the opening 7. Furthermore, the outer part of the sector 26 which moves in front of the opening 7 is painted with two different colours, for instance in white and red on both sides of a separation line 27. It becomes thereby possible to roughly appreciate at a quick glance, the length of the film remaining on the film roll. If the colour of the area 28 only appears in the window, the film has not yet been exposed: if it is only the colour of the area 29, the film roll is empty: in the intermediate positions, both colours can be seen in the opening 7, and according as an area is larger than the other, the film remaining on the film roll is more or less than the half of the film. By suitable location of the line 27 separating the two coloured areas, it is possible to make the widths of the coloured areas seen in the opening 7 fairly proportional to the lengths of the exposed and of the unexposed film respectively.

What I claim is:

1. A footage indicator for motion picture cameras having a feeling lever, spring means to apply said lever upon the cylindrical surface of the film roll and a dial movable in front of a viewing opening provided in the wall of the camera, said indicator comprising a shaft pivotally arranged in the camera to support said lever and dial and extending outside of the camera, and a control knob secured to the outer end of said shaft, whereby said feeling lever is strongly applied upon the film roll before the reading of the dial.

2. A footage indicator for motion picture cameras having a feeling lever, spring means to apply said lever upon the cylindrical surface of the film roll and a dial movable in front of a viewing opening provided in the wall of the camera, said indicator comprising a shaft pivotally arranged in the camera to support said lever and dial and extending outside of the camera, and a control knob secured to the outer end of said shaft, whereby said feeling lever is strongly applied upon the film roll before the reading of the dial which is provided with two areas painted with different colours on either side of a separation line the form of which is determined so that the surfaces of the differently painted areas seen through the opening are substantially proportional to the lengths of the unexposed and exposed film respectively.

3. A footage indicator for motion picture cameras having a feeling lever, spring means to apply said lever upon the cylindrical surface of the film roll and a dial movable in front of a viewing opening provided in the wall of the camera, said indicator comprising a shaft pivotally arranged in the camera to support said lever and dial and extending outside of the camera, and a control knob secured to the outer end of said shaft, whereby said feeling lever is strongly applied upon the film roll before the reading of the dial having the shape of a sector of which the outer part is provided with two areas painted with different colours on either side of a separation line the form of which is determined so that the surfaces of the differently painted areas seen through the opening are substantially proportional to the lengths of the unexposed and exposed film respectively.

JACQUES BROÏDO.

References Cited in the file of this patent

UNITED STATES PATENTS

| Number | Name | Date |
|---|---|---|
| 907,928 | Wheeler | Dec. 29, 1908 |
| 1,090,128 | Avers | Mar. 17, 1914 |
| 1,176,329 | Underwood | Mar. 21, 1916 |
| 1,495,357 | Rivetta | May 27, 1924 |
| 1,680,647 | Stark et al. | Aug. 14, 1928 |
| 1,755,105 | Douglass | Apr. 15, 1930 |
| 1,879,737 | Del Riccio | Sept. 27, 1932 |
| 1,933,784 | Wittel | Nov. 7, 1933 |
| 1,987,041 | Wood | Jan. 8, 1935 |
| 2,015,261 | Eckler | Sept. 24, 1935 |
| 2,033,713 | Hughey | Mar. 10, 1936 |
| 2,034,978 | Goldhammer | Mar. 24, 1936 |
| 2,039,697 | Wittel | May 5, 1936 |
| 2,238,482 | Wittel | Apr. 15, 1941 |
| 2,392,212 | Zuber | Jan. 1, 1946 |